(12) United States Patent
Jensen et al.

(10) Patent No.: US 7,380,265 B2
(45) Date of Patent: May 27, 2008

(54) SYSTEM FOR MONITORING DIRECT BROADCAST WIRELESS SIGNALS

(75) Inventors: Jason Jensen, Ft. Lauderdale, FL (US); Ronald D. Allen, Micco, FL (US)

(73) Assignee: The DIRECTV Group, Inc., El Segundo, CA (US)

( * ) Notice: Subject to any disclaimer, the term of this patent is extended or adjusted under 35 U.S.C. 154(b) by 1136 days.

(21) Appl. No.: 10/400,726

(22) Filed: Mar. 26, 2003

(65) Prior Publication Data

US 2004/0078743 A1    Apr. 22, 2004

Related U.S. Application Data

(60) Provisional application No. 60/419,258, filed on Oct. 16, 2002.

(51) Int. Cl.
*H04N 7/173* (2006.01)
(52) U.S. Cl. .......................... 725/107; 725/63; 725/31; 725/39
(58) Field of Classification Search ................ 725/105, 725/107, 31, 54; 348/180, 192; 714/755
See application file for complete search history.

(56) References Cited

U.S. PATENT DOCUMENTS

| | | | | |
|---|---|---|---|---|
| 5,920,572 A | * | 7/1999 | Washington et al. ......... | 370/535 |
| 6,011,868 A | * | 1/2000 | van den Branden et al. ..... | 382/233 |
| 6,285,396 B1 | * | 9/2001 | Har Shoshanim et al. .. | 348/180 |
| 6,917,627 B1 | * | 7/2005 | Footer ......................... | 370/466 |
| 6,990,676 B1 | * | 1/2006 | Proehl et al. ................. | 725/40 |
| 7,024,676 B1 | * | 4/2006 | Klopfenstein ................ | 725/49 |
| 7,085,529 B1 | * | 8/2006 | Arsenault et al. .......... | 455/3.02 |
| 2001/0019658 A1 | * | 9/2001 | Barton et al. ................. | 386/46 |
| 2002/0034179 A1 | * | 3/2002 | Ollikainen et al. ......... | 370/389 |
| 2002/0073424 A1 | * | 6/2002 | Ward et al. .................... | 725/42 |
| 2002/0092015 A1 | * | 7/2002 | Sprunk et al. ................. | 725/9 |
| 2002/0191116 A1 | * | 12/2002 | Kessler et al. ............. | 348/723 |
| 2004/0006768 A1 | * | 1/2004 | Deshpande et al. ........... | 725/44 |

FOREIGN PATENT DOCUMENTS

| | | |
|---|---|---|
| CN | 1150738 A | 5/1997 |
| CN | 1325231 A | 12/2001 |
| WO | WO 01/37465 A2 | 5/2001 |

OTHER PUBLICATIONS

Chinese First Office Action dated Jun. 8, 2007 in Chinese counterpart application No. 200310101272.2.

* cited by examiner

*Primary Examiner*—Christopher Grant
*Assistant Examiner*—John Schnurr

(57) ABSTRACT

A system and method for monitoring direct broadcast satellite signals. In a most general embodiment, the invention (10) includes a mechanism (20) for receiving direct broadcast wireless signals encoded in accordance with a DSS transport protocol. The received signals are analyzed with respect to various parameters and an output is provided in response thereto. In a specific embodiment, the wireless signals are transmitted via satellite and plural integrated receiver decoders (20) are used, one with an associated channel, to receive the wireless signals and provide audio, video, program guide and conditional access signals in response thereto. These signals are analyzed by software (100) running on a computer (56) which outputs alarm data on the detection of anomalies in the received signals.

22 Claims, 5 Drawing Sheets

SYSTEM FOR MONITORING DIRECT BROADCAST WIRELESS SIGNALS

CROSS-REFERENCE TO RELATED APPLICATIONS

This application claims benefit of U.S. Provisional Application entitled NETWORK TEST SYSTEM FOR SATELLITE DIRECT TO HOME (DTH) NETWORK, filed Oct. 16, 2002 Ser. No. 60/419,258.

BACKGROUND OF THE INVENTION

1. Field of the Invention

The present invention relates to test systems. More specifically, the present invention relates to network test systems.

2. Description of the Related Art

Direct broadcast satellite systems transmit audio and video television signals directly to receivers located at subscriber locations, typically in the home. Currently, the network is monitored manually. That is, an individual physically monitors the video and audio output of one or more channels of a direct broadcast satellite receiver. While this approach may be acceptable in applications where a small number of channels are used, inasmuch as current systems employ 300-400 channels, manual monitoring has severe limitations and is somewhat subjective.

Automatic monitoring has been available to a limited extent to detect packet loss for certain communication systems using MPEG2 analyzers. However, these analyzers are incapable of detecting frozen frames and are not adapted to work upstream with the direct transport protocol of direct satellite system (DSS) signals used in direct to home (DTH) networks. Use of MPEG2 analyzers downstream of a receiver adapted to decode direct transport protocol formatted signals would be prohibitively expensive for most applications due to the relatively high cost of each analyzer (on the order of thousands of dollars) and the need to provide an analyzer on each downstream channel in a system having several hundred channels.

Hence, a need exists in the art for a system and method for automatic remote monitoring multiple broadcast channels of a direct to home (DTH) satellite television network in or near real time.

SUMMARY OF THE INVENTION

The need in the art is addressed by the system and method for monitoring direct broadcast satellite signals of the present invention. In a most general embodiment, the invention includes a mechanism for receiving direct broadcast wireless signals encoded in accordance with a DSS transport protocol. The received signals are analyzed with respect to various parameters and an output is provided in response thereto.

In a specific embodiment, the wireless signals are transmitted via satellite and plural integrated receiver decoders are used, one with an associated channel, to receive the wireless signals and provide audio, video, program guide and conditional access signals in response thereto. These signals are analyzed by software running on a computer which outputs alarm data on the detection of anomalies in the received signals.

The inventive system enables remote monitoring of broadcast center attributes in real-time and near real-time; monitors and collects errors and faults in the broadcast network; and calculates the on-air availability of the system.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
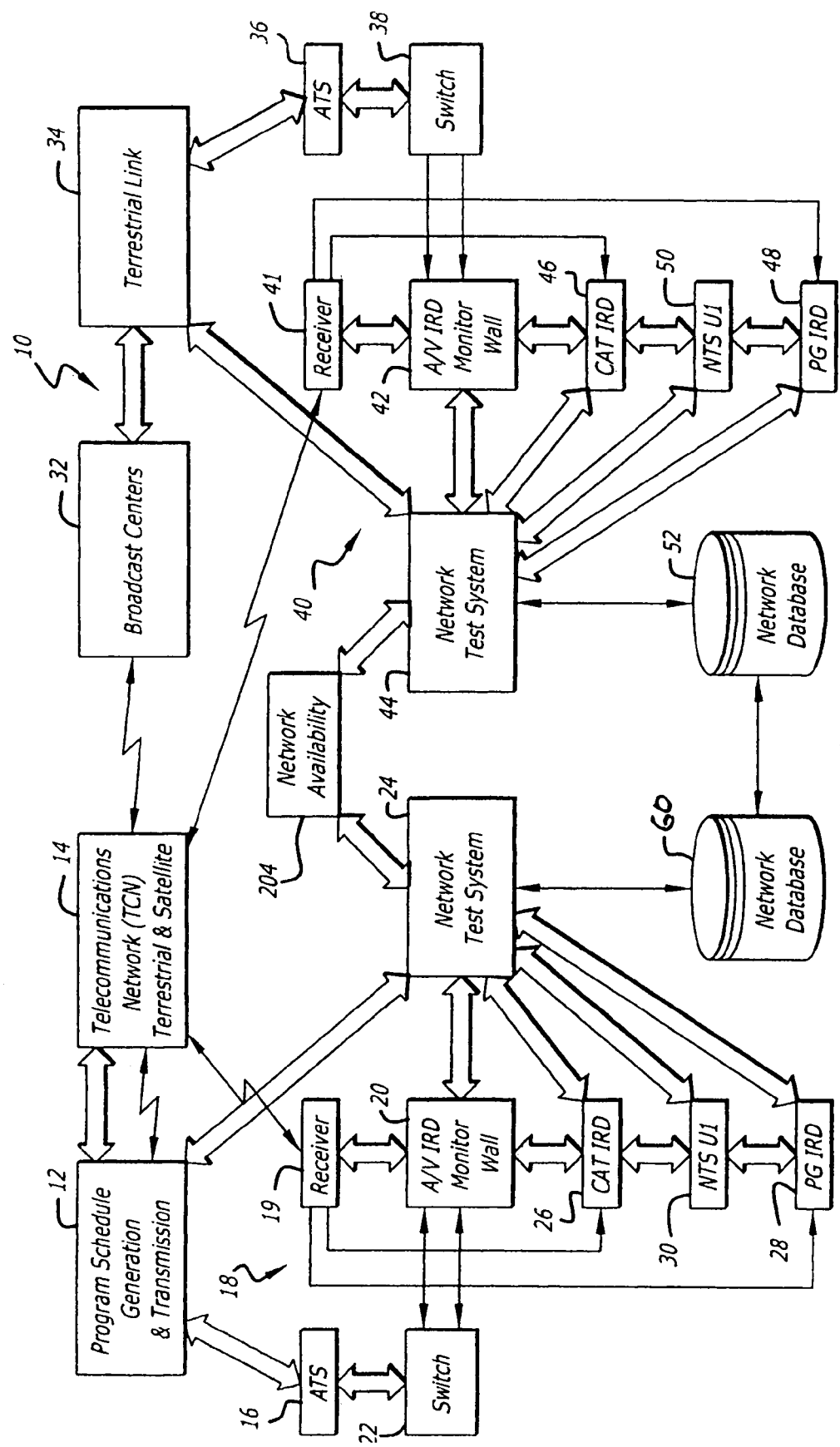
FIG. 1 is a simplified block diagram of an illustrative implementation of the system for monitoring direct broadcast wireless signals of the present invention.

FIG. 1 is a simplified block diagram of an illustrative implementation of the system for monitoring direct broadcast wireless signals of the present invention. In the illustrative embodiment, the inventive system is adapted for use in a direct to home (DTH) satellite network 10. Nonetheless, those skilled in the art will appreciate that the present teachings are not limited thereto. The present teachings may be applied to other applications without departing from the scope thereof. The network 10 includes a source 12 for program scheduling, generation and transmission. The program source 12 communicates with a telecommunications network (TCN) 14 which includes one or more satellites and a number of terrestrial repeaters (not shown) via wired as well as wireless channels. In the direct to home broadcast satellite network operated by DIRECTV LATIN AMERICA the program source 12 is implemented in software via an international program guide, which generates and processes program information. The program information includes viewer channel information along with a broadcast operations channel (BOC) associated therewith. The program guide information is then processed and uplinked to one or more direct broadcast satellites for retransmission to the subscriber.

The telecommunications network 14 communicates with plural broadcast centers (of which only one is shown 32) and multiple receiver subsystems of which two are shown in FIGS. 1, 18 and 40. Inasmuch as the first and second receiver subsystems 18 and 40 are substantially identical, only the first receiver subsystem 18 will be described in detail below. The first receiver subsystem 18 communicates with plural broadcast centers 32 wirelessly via the satellites and terrestrial repeaters of the telecommunications network 14. The receiver subsystem 18 includes a receiver 19 adapted to communicate with a satellite in the TCN 14. The receiver is coupled to a set of integrated receiver/decoders (IRDs) 20 provided to receive audio and video signals in response to tuning commands received from the ATS 16 via the switch 22. The output of the receiver 19 is also fed to a conditional access IRD 26 and a program guide IRD 28. In the preferred embodiment, the IRDs are Thompson GLA v2.25 IRDs. These IRDs are designed to provide error messages if the audio or video drivers fail due to the absence of a signal. The conditional access IRD 26 serves to extract an encrypted control word packet from the signal received from the satellite, which identifies the program content a given user is entitled to receive in accordance with the user's account information and preferences. The program guide IRD 28 is used to extract data with respect to program scheduling information. In accordance with the present teachings, data from the conditional access IRD 26 and program guide IRD 28 are processed by a an NTS UI 30 and a network test system 24. In the illustrative implementation, the NTS UI 30 is implemented with a stand-alone computer.

The program source 12 communicates directly with the network test system 24 and an automatic tuning system (ATS) 16 used in connection therewith. The network test system 24 uses program guide information from the source 12 to tune to a specific channel or group of channels and to effect program guide information comparison. The ATS 16 is an optional auxiliary computer provided to effect tuning of the audio/video IRDs 20 via a bank of switches 22.

As discussed more fully below, the network test system 24 receives the outputs from the IRDs 20, 26 and 28 along with the output of the NTS UI 30 and outputs data with respect to certain parameters of the received signals. On command from the network test system 24, the IRDs 20 decode the received signal in accordance with the DSS transport protocol and output information with respect to the presence or absence of video and audio signals in the signals received from the satellites (not shown). The network test system monitors the error messages provided by the IRDs and emits an alert to the users advising them that there is a loss of audio or video on a specific viewer channel. The network test system timestamps that error message and continues to monitor that viewer channel until the audio and video are restored, and then creates an automatic log for calculated outage duration.

Figure 2:
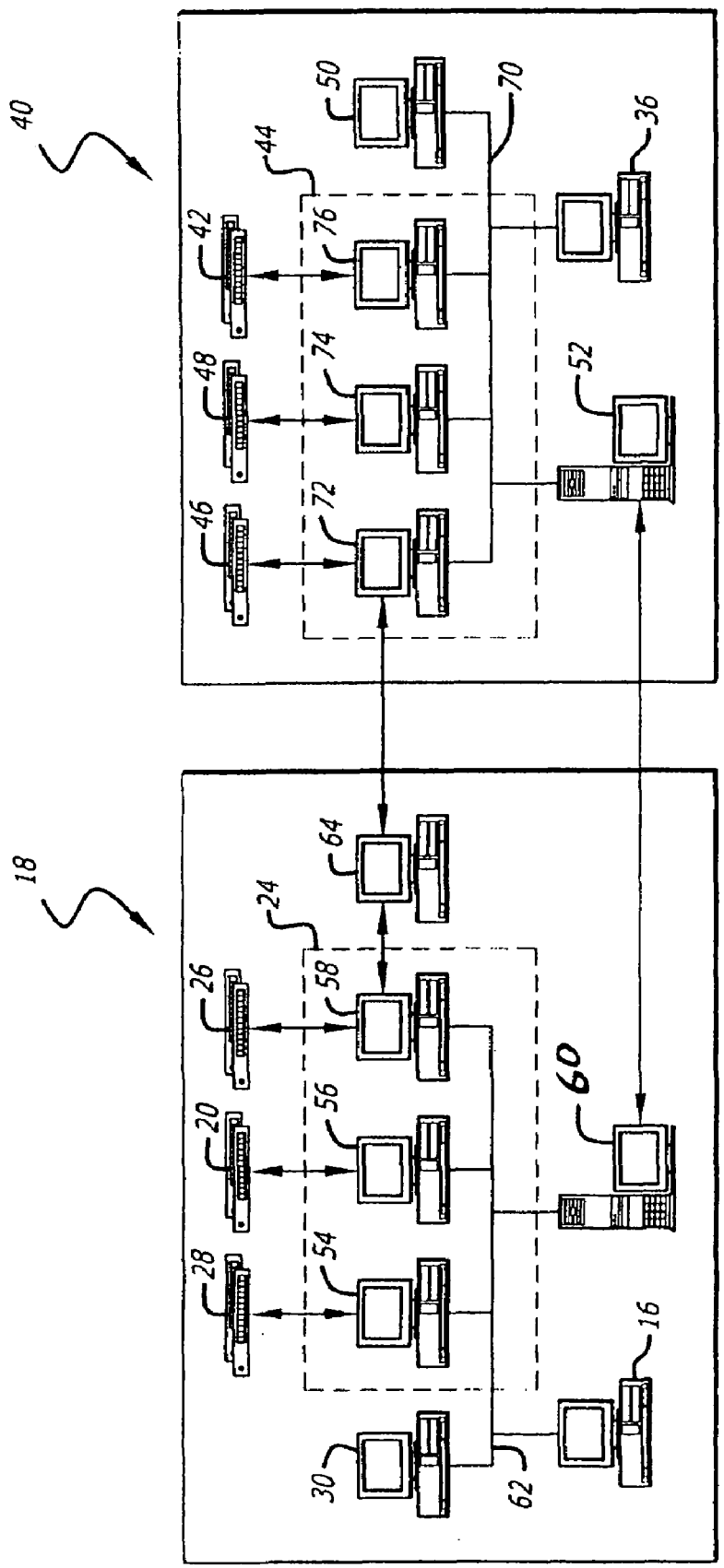
FIG. 2 is a simplified diagram of the first and second receiver subsystems of FIG. 1.

FIG. 2 is a simplified diagram showing illustrative implementation of the first and second receiver subsystems of FIG. 1. As shown in FIG. 2, in the illustrative embodiment, the network test system 24 of the first receiver subsystem 18 may be implemented with first, second and third computers 54, 56 and 58 programmed to implement program guide monitoring, audio video monitoring and conditional access monitoring respectively. Accordingly, the first, second and third computers are connected to the program guide, audio/video and conditional access IRDs 28, 20 and 26 respectively.

The NTS UI 30 serves as a user interface and is connected to the network test system 24 via a bus 62. Also connected to the bus 62 is the optional auxiliary ATS computer 16, an NTS database server 60, and a second stand-alone computer 64 designed to provide conditional access encryption decoding functionality as discussed more fully below.

Figure 3:
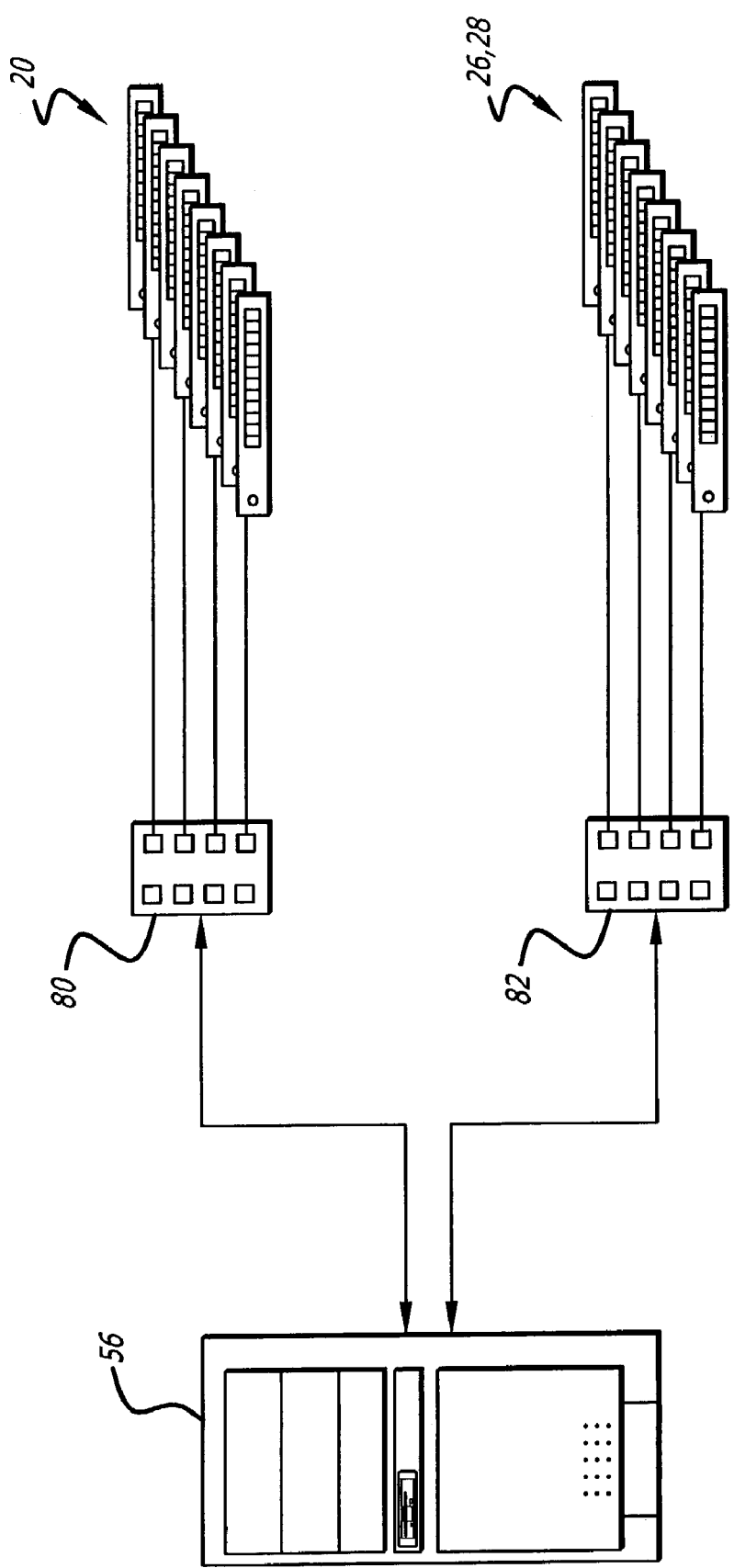
FIG. 3 is a simplified block diagram of an illustrative implementation of the connections between a computer in the network test system and an associated IRD in accordance with the teachings of the present invention.
Figures 1, 4:
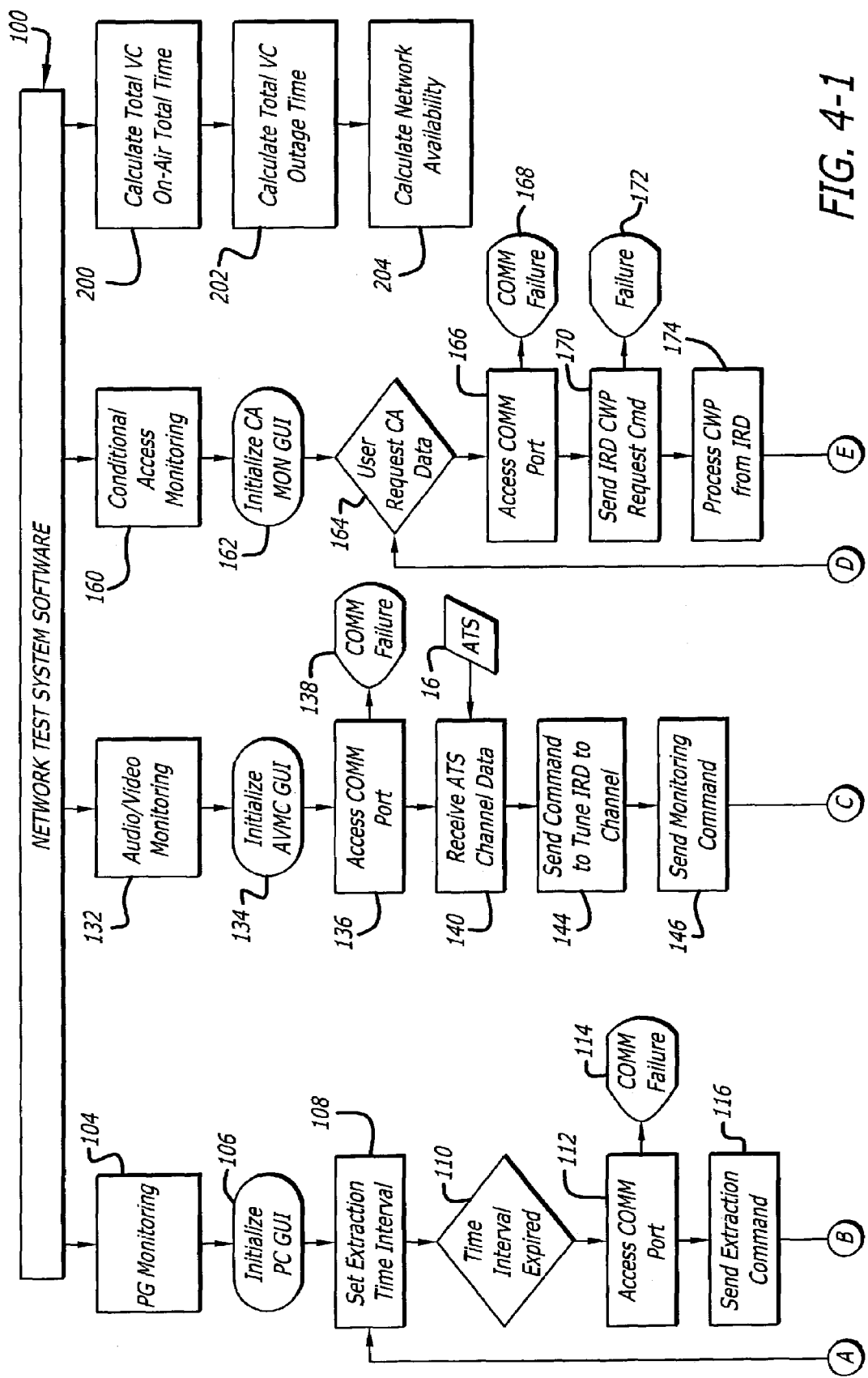
FIG. 4 is a flow diagram of an illustrative embodiment of a method for monitoring direct broadcast wireless signals in accordance with the teachings of the present invention.
Figures 2, 4:
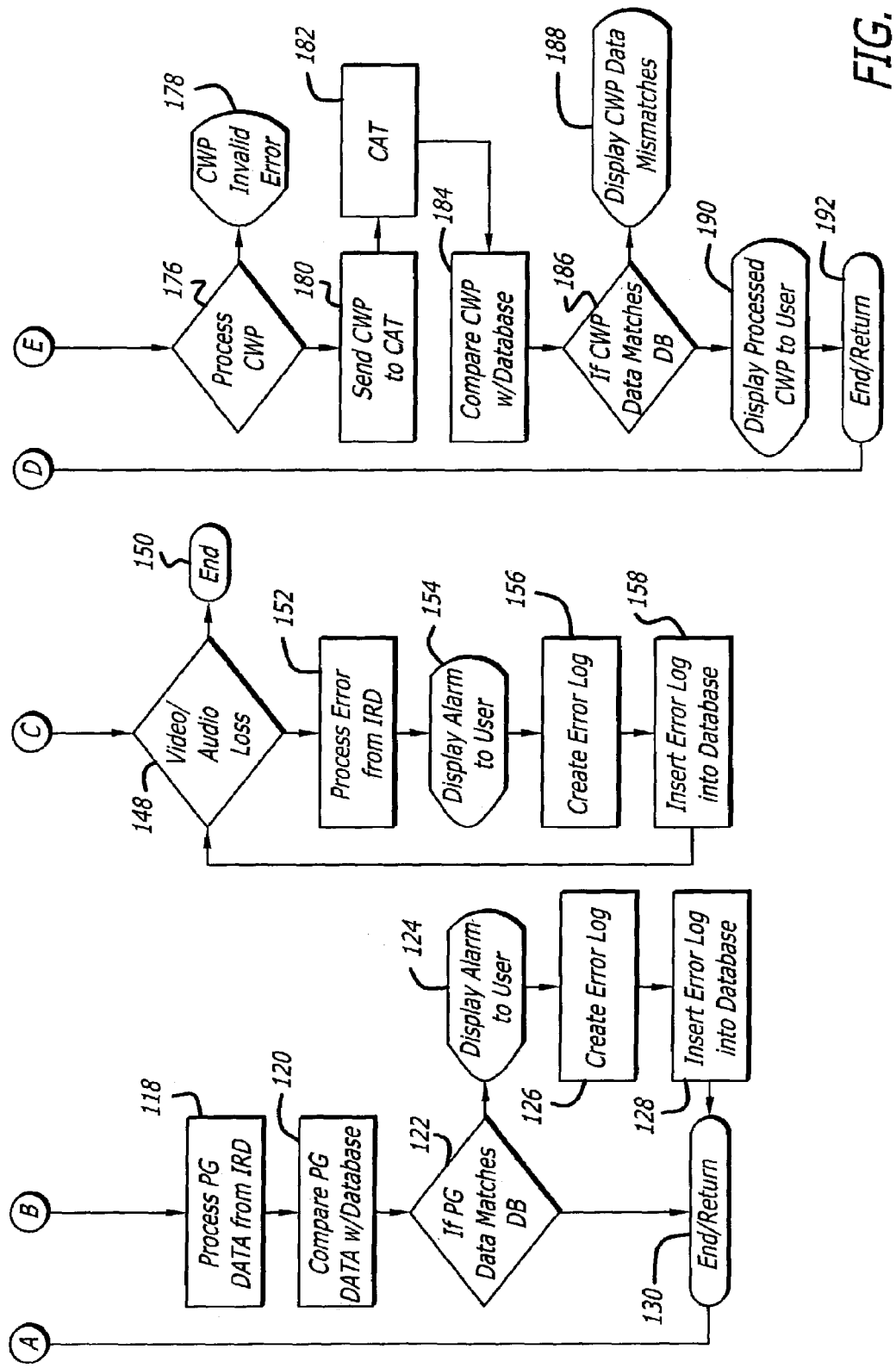

As illustrated in FIGS. 3 and 4 below, the network test system 24 may be implemented with one or more computers on which software designed in accordance with the method embodied in the flow diagram of FIG. 4 is stored and executed. FIG. 3 is a simplified block diagram of an illustrative implementation of the connections between a computer in the network test system and an associated IRD in accordance with the teachings of the present invention. In FIG. 3, the audio/video monitor 56 may be implemented as a commercially available off-the-shelf (COTS) computer. Each computer communicates with associated IRDs through a serial card 80, 82 effective to allow multiple IRDs 20 and 26,28 to be individually accessed through a single serial port such as the currently commercially available Equinox SST serial port module.

FIG. 4 is a flow diagram showing an illustrative embodiment of the method for monitoring direct broadcast wireless signals in accordance with the teachings of the present invention. The software 100 includes a program guide monitoring module 104, an audio video monitoring module 132, and a conditional access monitoring module 160. In the program guide monitoring module 104, the first step is to initialize the program guide graphical user interface (step 106). Next, at step 108, an extraction time interval is set e.g., five minutes. At step 110, the system tests for the expiration of the time interval and, when the time interval has expired, at step 112, the system accesses the port to the program guide IRD 28 of FIG. 1. At step 116, an extraction command is sent to the associated IRD 28. At step 118, the software 100 processes the data from the IRD and, at step 120, compares the data with the data stored in the database 60 of FIG. 1. As shown in FIG. 4, at step 122, if the program guide data from the IRD 28 does not match the program guide data stored in the database 60, at step 124, an alarm is displayed to the user and at step 126 an error log is created. Finally, at step 128, an entry is made in the database 60.

The audio/video monitoring module 132 begins with the step 134 of initializing the graphical user interface. As in the program guide monitoring module 104 and the conditional access monitoring module 160, this typically involves the provision of a number of web pages to the user. At step 136, the ports to the associated IRDs are accessed and channel data is received from the ATS 16 of FIG. 1. At step 144, channel tuning commands are sent to the IRDs from which information is to be gathered in accordance with the information received from the ATS 16. At step 146, monitoring commands are sent to the selected IRDs. The commands are received by the IRDs and, in turn, the IRDs return data indicative of the loss of audio and/or video. At step 148, the return data is analyzed for error. If an error is detected, at step 152, the error is processed and at step 154 an alarm is displayed to the user advising the user of a loss of audio or video in a given channel. In an illustrative application, the system will look for a loss of video or a freeze and, with respect to audio, the system will look for a loss of audio or a stereo pair. At step 156 an error log is created and at step 158 the error log is entered into the database 60.

In the conditional access monitoring module 160, the software 100 initializes the conditional access monitoring graphical user interface at step 162. At step 164, the system waits for a user to request data. When a request for data is received, the communication port for the requested channel is accessed at step 166. At step 170, a command is sent to the conditional access IRD 26 for the control word packet (CWP). At step 174, the CWP from the IRD 174 is processed. At step 176, the CWP is processed to ascertain whether or not it is a valid CWP. If it is valid, at step 180, it is sent to the CAT computer 64 of FIG. 2. The CAT (conditional access translator) computer 64 translates the encrypted CWP into a readable format and returns it at step 184 for comparison with the readable CWP stored in the database 60. If, at step 186, the CWP does not match the data stored in the database, at step 188 a mismatch indication is displayed to the user. If, however, at step 186 the CWP matches the data stored in the database, at step 190 a match condition is displayed to the user. The system then loops back to the user request step 164 and waits for the next request.

Thus, the present invention provides a suite of automated software tools that performs monitoring of on-air and upcoming schedules and channels. The tools detect video/audio outages, program guide, channel configuration and conditional access discrepancies. Each module monitors all channels on a continuous basis by extracting information from customized IRDs then compares it with the content of the current program guide.

The broadcast stream is monitored from the subscriber's perspective. The system checks information relevant to subscribers, e.g. Service ID, purchase ability, etc. Upon detecting failures, the system (each tool) sends alarms to Network Quality Monitoring personnel for immediate corrective action. The system also generates and stores in its database problem/outage logs and trend monitoring for ongoing analysis and Quality Improvement. The system may be used to generate Network Availability reports and provide trend monitoring for ongoing analysis and Quality Improvement. The system provides a scalable solution at minimal additional cost for extra channels. The present invention allows for On-Air Availability to be calculated by the NTS Database Server 60 of FIG. 1 using the following equation:

$$A \text{ (Source Beam Network)} = A = \frac{\sum_{1}^{n} CT_n - \sum_{1}^{n} CO_n}{\sum_{1}^{n} CT_n}$$

where:
CT=Total Viewer Channel On-Air Time Period
n=Channel Number
CO=Channel Outage Over Time Period
A=On-Air Availability The above availability evaluation criteria shall be applied independently to the source, beam and network. 'Source' includes all Viewer Channels that are provided to the DTVLA Network by a program provider, or a regional broadcast center. 'Beam' includes all Viewer Channels that are available in a specific satellite footprint available to DTVLA subscribers. 'Network' includes all Viewer Channels that are available across the DTVLA Network. In FIG. 4, the system first calculates the Total On-Air Viewer Channel Total 200 and the Total On-Air Outage Total 202, and then utilizes the above formula to produce the Total Network Availability 204 for DTVLA.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system for monitoring direct broadcast satellite signals comprising:
   a source of program guide data and program content including audio and video signals encoded in accordance with a DSS transport protocol;
   a network database storing conditional access data and program guide data;
   a satellite based network for direct broadcast of said content, program guide data and conditional access data in broadcast signals over a plurality of channels;
   a receiver subsystem at a test site, said receiver subsystem including,
      a receiver for receiving said broadcast signals;
      a plurality of audio/video integrated receiver decoders (IRDs) coupled to the receiver to receive audio and video signals associated with respective channels, decode the signals using audio and video drivers and, if the audio or video drivers fail due to the absence of the audio or video signal, output error messages regarding the loss of audio and/or video signals on the respective channels;
      a conditional access IRD coupled to the receiver to extract conditional access data; and
      a program guide IRD coupled to the receiver to extract program guide data; and
   a network test system computer configured to communicate with said IRDs, analyze the error messages, program guide data and conditional access data and output alarm data upon detection of anomalies in the analyzed data.

2. The system of claim 1, further comprising:
   a plurality of switches coupled to respective audio/video IRDs; and
   an automatic tuning system (ATS) computer that communicates directly with the source to use program guide data to control the switches to tune the audio/video IRDs to specific channels and to provide the channel assignments for the IRDs to the network test system computer.

3. The system of claim 2, wherein the ATS computer tunes the audio/video IRDs to continuously monitor a group of channels.

4. The system of claim 2 wherein the plurality of audio/video IRDs monitor all of the channels included in the program guide data on a continuous basis.

5. The system of claim 4, wherein the network test system computer is configured to monitor the total on-air time and outage time for each said channel and calculate an on-air availability for the system.

6. The system of claim 1, wherein the plurality of audio/video IRDS monitor all of the broadcast channels on a continuous basis.

7. The system of claim 6, wherein the network test system computer is configured to monitor the total on-air time and outage time based on the detected error messages for each said channel and calculate an on-air availability for the system.

8. The system of claim 1, wherein the network test system computer communicates with the IRDs through a serial card thereby allowing the computer to access said plurality of IRDs individually through a single serial port.

9. The system of claim 1, wherein the network test system computer is configured to detect anomalies in the program guide data by comparing the extracted program guide data to the program guide data stored in the network data base.

10. The system of claim 1, wherein the network test system computer is configured to detect anomalies in the conditional access data by comparing the extracted conditional access data to the conditional access data stored in the network data base.

11. The system of claim 1, wherein said network test system computer comprises:
   a first computer coupled to the program guide IRD to receive and analyze the program guide data to detect anomalies and display alarm data to a user;
   a second computer coupled to the plurality of audio/visual IRDs to individually access the IRDs through a single serial port, receive and analyze the audio and video signals to detect anomalies and display alarm data to a user; and
   a third computer coupled to the conditional access IRD to receive and analyze the conditional access data to detect anomalies and display alarm data to a user.

12. A system for monitoring direct broadcast satellite signals comprising:
   a source of program guide data and program content including audio and video signals encoded in accordance with a DSS transport protocol;
   a network database storing conditional access data and program guide data;
   a satellite based network for direct broadcast of said content, program guide data and conditional access data in broadcast signals over a plurality of channels;
   a receiver subsystem at a test site, said receiver subsystem including,
      a receiver for receiving said broadcast signals;
      a plurality of audio/video integrated receiver decoders (IRDs) coupled to the receiver to receive audio and video signals associated with respective channels, decode the signals and output content data regarding the loss of audio and/or video signals on the respective channels;
      a conditional access IRD coupled to the receiver to extract conditional access data; and
      a program guide IRD coupled to the receiver to extract program guide data; and
   a network test system computer configured to communicate with said IRDs, analyze the content data, program guide data and conditional access data and output alarm data upon detection of anomalies in the analyzed data, said network test system computer configured to initialize a program guide graphical user interface, at expiration of a time interval access a serial output port to the program guide IRD, send an extract command to the program guide IRD, detect anomalies in the extracted program guide data, display alarm data for any detected anomalies to a user using the program guide graphical user interface and record the anomalies in an error log.

13. A system for monitoring direct broadcast satellite signals comprising:
   a source of program guide data and program content including audio and video signals encoded in accordance with a DSS transport protocol;
   a network database storing conditional access data and program guide data;
   a satellite based network for direct broadcast of said content, program guide data and conditional access data in broadcast signals over a plurality of channels;
   a receiver subsystem at a test site, said receiver subsystem including,
      a receiver for receiving said broadcast signals;
      a plurality of audio/video integrated receiver decoders (IRDs) coupled to the receiver to receive audio and video signals associated with respective channels, decode the signals and output content data regarding the loss of audio and/or video signals on the respective channels;
      a conditional access IRD coupled to the receiver to extract conditional access data; and
      a program guide IRD coupled to the receiver to extract program guide data; and
   a network test system computer configured to communicate with said IRDs, analyze the content data, program guide data and conditional access data and output alarm data upon detection of anomalies in the analyzed data, said network test system computer is configured to initialize a audio/video monitoring graphical user interface, access serial output ports to the audio/visual IRDs, send channel tuning commands to the audio/visual IRDs, send monitoring commands to the audio/visual IRDs, detect anomalies in the received content data, display alarm data for any detected anomalies to a user using the graphical user interface and record the anomalies in an error log.

14. A system for monitoring direct broadcast satellite signals comprising:
   a source of program guide data and program content including audio and video signals encoded in accordance with a DSS transport protocol;
   a network database storing conditional access data and program guide data;
   a satellite based network for direct broadcast of said content, program guide data and conditional access data in broadcast signals over a plurality of channels;
   a receiver subsystem at a test site, said receiver subsystem including,
      a receiver for receiving said broadcast signals;
      a plurality of audio/video integrated receiver decoders (IRDs) coupled to the receiver to receive audio and video signals associated with respective channels, decode the signals and output content data regarding the loss of audio and/or video signals on the respective channels;
      a conditional access IRD coupled to the receiver to extract conditional access data; and
      a program guide IRD coupled to the receiver to extract program guide data; and
   a network test system computer configured to communicate with said IRDs, analyze the content data, program guide data and conditional access data and output alarm data upon detection of anomalies in the analyzed data, said network test system computer is configured to initialize a conditional access monitoring graphical user interface, access a serial output port to the conditional access IRD, send a request command to the conditional access IRD, detect anomalies in the extracted conditional access data, and display alarm data for any detected anomalies to a user using the graphical user interface.

15. A network test system for monitoring direct broadcast satellite signals comprising:
   a source of program guide data and program content including audio and video signals encoded in accordance with a DSS transport protocol;
   a receiver subsystem for receiving direct satellite broadcast of said program content data encoded in accordance with a DSS transport protocol in broadcast signals over a plurality of channels at a test site, said receiver subsystem including, a receiver for receiving said broadcast signals; and a plurality of audio/video integrated receiver decoders (IRDs) coupled to the receiver to receive signals associated with respective channels, decode the signals and return data indicative of the loss of audio and/or video for the respective channels; and a plurality of switches coupled to respective audio/video IRDs;

an automatic tuning system (ATS) that communicates directly with the source to use program guide data to control the switches to tune the respective IRDs to specific channels to monitor a group of said channels; and a network test system computer configured to communicate with said ATS to receive the channel assignments for the IRDs and with said IRDs to receive and analyze said data and output alarm data upon detection of errors in the analyzed content data for the respective channels.

16. The network test system of claim 15, further comprising a network database storing the program guide data and conditional access data, said receiver subsystem further comprising:

a conditional access IRD coupled to the receiver to extract conditional access data from said broadcast signals; and a program guide IRD coupled to the receiver to extract program guide data from said broadcast signals, wherein said network test system computer compares the extracted conditional access and program guide data to conditional access and program guide data stored in the network database and outputs alarm data upon detection of anomalies between the extracted and stored data.

17. The network test system of claim 15, wherein the audio/video IRDs return error messages if the audio or video drivers fail due to the absence of a signal.

18. A method for monitoring direct broadcast wireless signals including the steps of:

receiving direct broadcast wireless signals including audio and video signals encoded in accordance with a DSS transport protocol over a plurality of channels of a telecommunications network at a test site;

communicating directly, outside the telecommunications network, from a source of program guide data at a broadcast center to the test site to control a plurality of switches to tune a respective plurality of integrated receiver decoders (IRDs) at the test site to receive broadcast wireless signals associated with respective channels to monitor a group of said channels in accordance with the program guide data;

accessing ports to the associated IRDs to extract data indicative of the loss of audio and/or video for the respective channels; and analyzing the extracted data to output alarm data for the respective channels.

19. The method of claim 18, further comprising the steps of:

storing program content data and conditional access data in a network database;

controlling a conditional access IRD to extract conditional access data from the broadcast signals;

controlling a program guide IRD to extract program guide data from the broadcast signals; and comparing at least a portion of the extracted program content data to the stored program content data to detect mismatch and output alarm data.

20. The method of claim 18 wherein the audio/video IRDs return error messages if the audio or video drivers fail due to the absence of a signal.

21. The method of claim 18, wherein the plurality of IRDs are individually accessed through a single serial port.

22. The method of claim 21, wherein the switches are controlled to continuously monitor all of channels in accordance with the program guide data.

* * * * *